United States Patent [19]

Goldstein

[11] Patent Number: 4,867,686
[45] Date of Patent: Sep. 19, 1989

[54] BREAST CANCER DETECTION MODEL AND METHOD FOR USING SAME

[76] Inventor: Mark K. Goldstein, 1512 NW. 7th Pl., Gainesville, Fla. 32603

[21] Appl. No.: 308,914

[22] Filed: Feb. 9, 1989

[51] Int. Cl.[4] ............................................. G09B 23/28
[52] U.S. Cl. .................................................. 434/267
[58] Field of Search .................... 434/267, 274, 275

[56] References Cited

U.S. PATENT DOCUMENTS 4,134,218 1/1979 Adams et al. ...................... 434/267
4,737,109 4/1988 Abramson ........................... 434/267

OTHER PUBLICATIONS

"Model Breasts for Use in Teaching Breast Self-Examination", Journal of Bioengineering vol. 2, pp. 427-435, 1978.

Primary Examiner—Edward M. Coven
Assistant Examiner—Valerie Szczepanik
Attorney, Agent, or Firm—Panitch Schwarze Jacobs and Nadel

[57] ABSTRACT

A model of human female breast for teaching breast examination comprises an opaque, elastomeric membrane simulating skin, a transparent backing member connected to the opaque membrane to define a chamber therebetween, first means simulating adipose tissue disposed in the chamber, at least one second means simulating a tumor within the chamber and opaquing means overlying and being removably attached to the transparent backing member. In addition, the present invention is directed to a method of training a person to detect breast tumors by palpating said model.

19 Claims, 1 Drawing Sheet

BREAST CANCER DETECTION MODEL AND METHOD FOR USING SAME

FIELD OF THE INVENTION

The present invention relates to a model of a human female breast having simulated tumors therein for teaching breast examination. In addition, the present invention is directed to a method of training a person to detect breast tumors by palpating a model of a human female breast having simulated tumors disposed therein.

BACKGROUND OF THE INVENTION

Breast cancer is among the most common malignant forms of cancer and is a leading cause of death from cancer among women in the United States. It is well recognized that early detection of breast cancer is the single most important variable in the successful cure and treatment of the cancer.

Various methods for detecting breast cancer include angiography, ultrasonography, light scanning, isotope scanning, thermography, mammography and manual palpation. With the exception of manual palpation, these techniques are time consuming, expensive and require the interpretation of a trained specialist. Manual palpation, on the other hand, is easily and inexpensively performed and, with proper training, may be performed as a self-examination, promoting a greater sense of privacy and an increased frequency of examination.

The potential effectiveness of early detection by manual examination relies on the effectiveness of manual palpation. Nearly all breast cancers are potentially palpable and thus candidates for early detection by manual examination.

U.S. Pat. No. 4,134,218, the disclosure of which is incorporated herein by reference, discloses a model of a human female breast having means simulating skin, glandular, connective and/or skeletal tissue, adipose tissue and tumors. In addition, this patent discloses methods of using a more sophisticated model containing electric conductors to train a person to detect breast tumors by palpation by automatically generating a set of signals representative of the pattern of pressure applied to the model by the person. However, this more sophisticated model and method is used with electrical apparatus and means for interpreting the signals generated and requires the use of a microprocessor, adding to the complexity and cost of the model.

The present invention is based on new evidence indicating that training a person to achieve a certain proficiency in palpation techniques, more specifically those for the early detection of breast cancer, may be reinforced by the interrelationship of visual and tactile stimuli. It would be desirable to have a model of a human female breast and methods of using the same for teaching breast examination which would foster the interrelationship of visual and tactile stimuli.

BRIEF SUMMARY OF THE INVENTION

A model of a human female breast for teaching breast examination comprises an opaque, elastomeric membrane simulating skin, a transparent backing member connected to the opaque membrane to define a chamber therebetween, first means simulating adipose tissue disposed in the chamber, at least one second means simulating a tumor within the chamber and opaquing means overlying and being removably attached to the transparent backing member.

In addition, the present invention is directed to a method of training a person to detect breast tumors by palpating a model of a human female breast having at least one simulated tumor disposed therein, where the model has an opaque, elastomeric membrane simulating skin and a transparent backing member providing means for visually inspecting the presence and location of the simulated tumor, the method comprising overlying and removably attaching opaquing means to the transparent backing member of the model, palpating the model in a predetermined pattern to create a tactile sensation in the person as to the presence and location of a simulated tumor, removing the opaquing means, visually inspecting the model to visually determine the presence and location of a simulated tumor and palpating the model to confirm the presence and location of a simulated tumor by tactile sensation.

BRIEF DESCRIPTION OF THE DRAWINGS

The foregoing brief summary of the invention, as well as the following detailed description of preferred embodiments will be better understood when read in conjunction with the appended drawings. For the purpose of illustrating the invention, there are shown in the drawings embodiments which are presently preferred, it being understood, however, that the invention is not limited to the specific arrangements and instrumentalities disclosed. In the drawings.

DETAILED DESCRIPTION OF PREFERRED EMBODIMENTS

Figure 1:
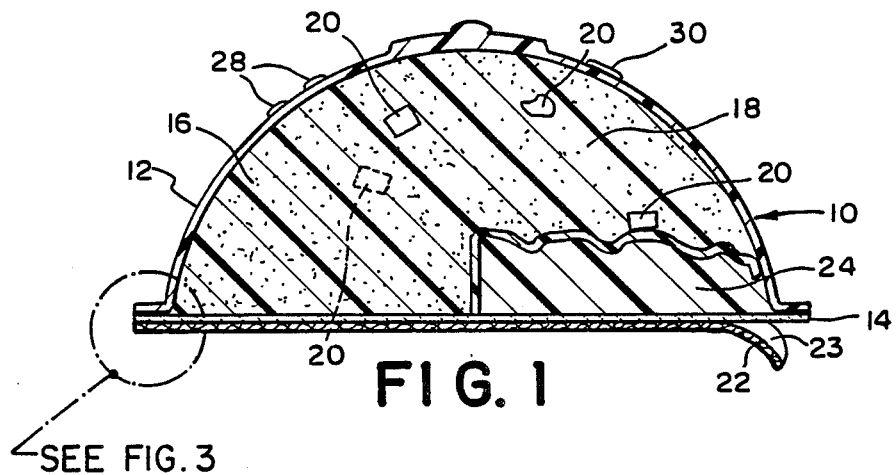
FIG. 1 is a sectional view of one embodiment of a model of a human female breast according to the present invention.
Figure 2:
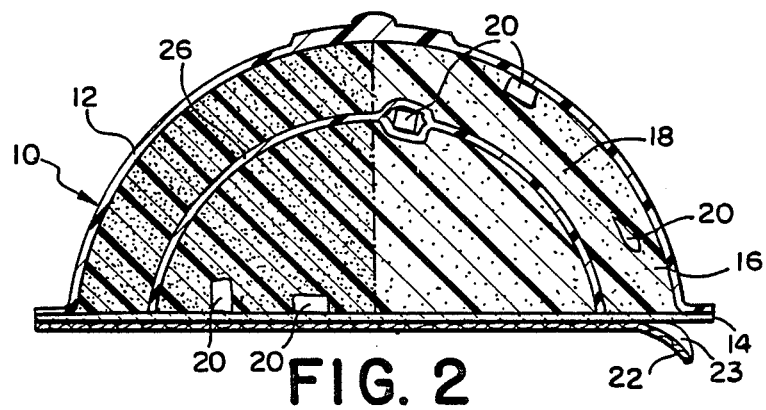
FIG. 2 is a sectional view of a second embodiment of a model of human female breast incorporating means simulating glandular, connective and/or skeletal tissue.

Referring to the drawings, wherein like numerals indicate like elements throughout, there is shown in FIGS. 1 and 2 a model 10 of a human female breast for teaching breast examination. The model 10 should have physical characteristics, such as overall shape, and a nipple and areola region, for example, which closely simulate human tissue so that examination techniques will be learned through actual practice with realistic tactile stimuli. It is preferred that a model 10 be available in several sizes and varying degrees of firmness so as to apply to a large cross-section of the female population.

The model 10 is substantially hemispherical in shape and generally comprises an opaque, elastomeric membrane 12 simulating skin, a transparent backing member 14 connected to the opaque membrane 12 to define a chamber 16 therebetween, first means 18 simulating adipose tissue disposed in the chamber 16 and at least one second means 20 simulating a tumor within the chamber 16.

The skin 12 may be made of any material which closely simulates human skin. Preferably, the skin 12 comprises polyvinyl chloride, polyurethane or elastomeric silicone resin polymers. Suitable elastomeric silicone resin polymers are commercially available from General Electric Company and Dow Corning Corporation, among others. For example, one presently preferred elastomeric silicone comprises medical grade liquid silicone rubber No. 27-4840 available from Dow Corning. Dow's No. 27-4840 silicone rubber is available as a two part kit: a gel and a curing agent. Satisfactory results for a realistic skin may be obtained by mixing the gel and the curing agent in a ratio of about 10:1 by weight, respectively. One skilled in the art will appreciate, however, that greater and lower gel:curing agent ratios may be used to form simulated human skin in accordance with the present invention.

The first means 18 simulating adipose tissue preferably comprises a gel compound and should impart a realistic feeling to the model 10. The material used to form the first means 18 should have a firmness or hardness suitable for simulating human female adipose tissue. Examples of suitable gel compounds include General Electric's RTV 1619 silicone gel compound and Dow Corning's silicone dielectric gel compound No. 3-6527. It is presently preferred that the first means comprises silicone dielectric gel compound No. 3-6527, which comprises a two part kit having a gel and a curing agent. Where the first means 18 comprises the silicone dielectric gel compound No. 3-6527, it is preferred that the gel component comprises about 50% to about 60% by volume of the dielectric gel compound and that the curing agent component comprises about 40% to about 50% by volume of the dielectric gel compound, depending on the desired hardness. One skilled in the art will appreciate that other gels having greater and lesser hardnesses may be used in accordance with the present invention to simulate adipose tissue.

The second means 20 simulating a tumor may comprise virtually any material capable of realistically simulating breast tumors, provided that the material is compatible with the other materials used in making the model 10. For example, second means 20 preferably comprises stainless steel ball bearings, and regularly or irregularly shaped bodies made of nylon, styrene, polyvinyl chloride, styrene and silicone. It is presently preferred that the second means 20 comprises sponged silicone rubber. Sponged silicone rubber may be prepared by combining a silicone rubber with an additional catalyst and a blowing agent. Typically such sponged silicone rubber is cured and extruded to shapes and sizes depending on the size and shape of the simulated tumor desired. Preferably the second means 20 has a durometer hardness of about 20 to about 60, although one skilled in the art will recognize that harder and softer simulated tumors may be used in accordance with the present invention. Sponged silicone rubber suitable for use as simulated tumors 20 in a model 10 according to the present invention is available from a variety of commercial sources.

The transparent backing member 14 may be comprised of the same material used to form the skin membrane 12. The material used to form the backing 14 must be transparent and should provide good optical clarity to allow for visual inspection of the contents of the model 10. The material(s) used to form the backing 14 and the skin 12 should be of a sufficient thickness and strength to withstand the repeated pressures exerted on the model 10 during palpation, although the skin 12 should not be so thick as to detract from the realistic feeling thereof.

According to the present invention, the model 10 is provided with opaquing means 22 overlying and being removably attached to the transparent backing member 14. The opaquing means 22 comprises virtually any material which is substantially opaque, preventing visual inspection of the contents of the model 10 when overlying the backing member 14 and which may be relatively easily removably attached to the transparent backing member 14. It is preferred that the opaquing means 22 be capable of repeated attachment and removal from the transparent backing member 14 for repeated use in preventing and allowing visual inspection of the contents of the model 10.

Preferably, the opaquing means 22 comprises an opaque, pliable sheet material or an opaque elastomeric membrane having an adhesive coating 23 on one side thereof. It is presently preferred that the opaquing means 22 comprises a paper or fabric sheet, such as the adhesive-backed satin cloth product No. 361 produced by the Fasson Specialty Division of Avery International Company of Painesville, Ohio. The satin cloth No. 361 comprises a rayon acetate cloth having a fabric adhesive on one side thereof. The adhesive used in the satin cloth No. 361 is a pigmented rubber base fabric adhesive. One skilled in the art will appreciate, however, that other opaque, pliable sheet materials, such as polymeric resin materials, paper, other fabrics, and opaque elastomeric membranes coated with a suitable adhesive may be used as opaquing means 22 in accordance with the present invention, as well as other opaque materials.

It is not critical to use the particular materials suggested for forming the skin membrane 12, the first means 18 simulating adipose tissue and the second means 20 simulating tumors. Rather, the model 10 should have the complex feel of adipose tissue within a human female breast and the tumors 20 should accurately simulate the feel of real tumors. If desired, small particles of silica or other inert material may be added to the first means 18 simulating adipose tissue to provide a realistic, granular feel to the model 10. Various pigments well known to those skilled in the art may be incorporated in the skin-simulating material to provide a good visual representation of a real breast. Pigments may also be incorporated into the material comprising the second means 20 to provide easy visual differentiation for distinguishing between various types of tumors.

The model 10 may be formed using various techniques known in the art for molding and curing elastomeric materials. For example, the skin 12 may be formed in a vacuum mold formed to the desired shape of a human female breast. Once molded and cured, the skin 12 may be left in the mold and the remaining components forming the model 10 may be added thereto. For example, a silicone dielectric gel used to form the first means 18 may be poured into the molded skin and subsequently cured while in the mold.

It may be desired to have a model 10 wherein the first means 18 has different hardnesses in different regions throughout the model 10 to simulate softer and firmer adipose tissue in one model. This may be accomplished by, for example, placing a divider in the molded and cured skin 12 and pouring into the chambers defined by the divider adipose tissue-simulating materials of different hardnesses. After a suitable period of time, preferably prior to completion of the curing of the materials simulating adipose tissue, the divider may be removed, allowing the material to flow into and fill any gaps remaining while still maintaining the integrity of the different regions.

One skilled in the medical arts will appreciate that, in the human female breast, the skin and adipose tissue are intertwined with and overlying glandular, connective (including muscular) and skeletal tissues. For this reason, it may be desired to provide a third means 24 simulating glandular, connective and/or skeletal tissue being disposed in the chamber 16 and adjacent the backing member 14. Preferably, the third means 24 comprises a material similar to the material used to form the first means 18 (i.e., an elastomeric gel) but should be harder or firmer than the material used to form the first means 18. One skilled in the medical arts will appreciate, that the surface of the third means 24 adjacent the first means 18 (i.e., the surface closest to the skin membrane 12) should have an irregular surface to simulate the nodular or granular feeling of real glandular, connective and/or skeletal tissue.

In one preferred embodiment according to the present invention, the third means 24 comprises the silicone dielectric gel compound No. 3-6527 comprising about 30% to about 40% by volume of the gel component and about 60% to about 70% by volume of the curing agent component. To achieve the desired modularity of the third means 24, the material comprising the third means 24 may be formed and cured in sheets, for example, which may then be cut into small squares or other shapes of various sizes prior to locating the third means 24 in the model 10. One skilled in the art will appreciate the third means 24 may be formed from different materials using different techniques known in the art. The critical aspect of the third means 24 is that it accurately simulate the glandular, connective and/or skeletal tissue of a real human female breast.

The third means 24 is located in the model 10 adjacent the backing member 14 and may be located throughout the entire model 10 or only in a portion thereof, the latter as illustrated in FIG. 1. The presence of the third means 24 throughout only a portion of the model 10 may be desired to provide greater tactile differentiation in one model 10 according to the present invention. For example, it may be desired to have a model 10 which may be palpated in a region lacking third means 24 to more easily determine the presence or absence of simulated tumors 20 for a person first learning proper examination techniques but also having a model 10 which allows for more advanced training by providing a more complex structure. This could be accomplished using one model 10 as illustrated in FIG. 1.

It will be appreciated by one skilled in the medical arts that real breast tumors are located in various locations in the human female breast and are prone to feel as though they are relatively fixed in position or free floating. Accordingly, the feel of such tumors and difficulty in identifying the presence of such tumors by palpation varies. For this reason, it is desirable to locate the simulated tumors 20 in varying locations in the model 10 according to the present invention. For example, in one embodiment, the second means 20 simulating tumors are disposed adjacent the skin 12 and/or the transparent backing 14 and/or the third means 24 simulating glandular, connective and/or skeletal tissue, and/or disposed within the first means 18 simulating adipose tissue and not adjacent the remaining components of the model 10. In addition, it may be desired to dispose the second means 20 so that the simulated tumors are in a relatively fixed position or free floating. The second means 20 may be disposed in a fixed position by attaching, by adhesive or other substantially permanent means, some or all of the second means 20 to the skin membrane 12, the transparent backing 14 and/or the third means 24.

As illustrated in FIG. 2, alternative means for disposing second means 20 in a relatively fixed position within the model 10 comprises an elastomeric membrane 26. Such membrane 26 may comprise one or more layers of an elastomeric material similar to that used in forming the skin 12 and the transparent backing 14. The membrane 26 is substantially hemispherical in shape. The second means 20 may be affixed to the membrane 26 by encapsulation as illustrated in FIG. 2, or by a suitable adhesive, for example. One skilled in the art will recognize that the second means 20 simulating tumors may be disposed in a relatively fixed position in the model 10 by other means known in the art, the primary requirement being that such means not interfere with the realistic feeling of the model 10.

The transparent backing member 14 is connected or secured to the skin membrane 12 by any suitable adhesive or technique which provides a leak-proof chamber containing the first and second means (18 and 20) the third means 24 where desired and one or more elastomeric membranes 26 for securing the second means 20 where desired.

Figure 3:
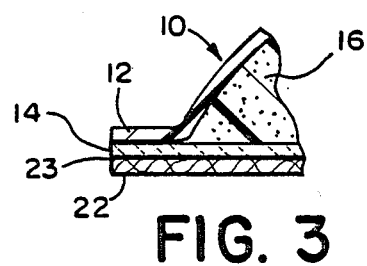
FIG. 3 is an enlarged sectional view of the area as designated in FIG. 1 showing an opaque membrane simulating skin connected to a transparent backing member, overlying which is a removably attached opaquing means.

As illustrated in FIGS. 1 through 3, the opaquing means 22 having an adhesive coating 23 on one side thereof is adhesively attached to the backing member 14 so that the opaquing means 22 is overlying the transparent backing member 14, preventing visual inspection of the contents of the model 10.

Where the contents of the model 10 are differentiated into different or distinct areas, such as differing hardnesses of the first means 18 simulating adipose tissue or the localized presence of third means 24 simulating glandular, connective and/or skeletal tissue, it may be desired to identify the regions or quadrants accordingly. For example, substantially permanent identifying marks may be achieved by molding letters, numerals or other marking characters, symbols or words into the skin membrane 12. Such molding may result in raised lettering 28, 30 for example, as shown in FIG. 1 or recessed lettering (not shown). Where such raised lettering 28, 30 or recessed lettering is present, such lettering should not interfere with the use of the model 10. Specifically the presence of such marking should not substantially interfere with the tactile sensation of a person palpating the model 10. According to the one embodiment of the present invention, the skin 12 has molded raised lettering 28, 30 which extend less than 0.5 mm, from the surface of the skin 12. It is believed that such lettering does not substantially interfere with the tactile sensation of a person palpating the model 10 while being sufficient to differentiate by palpation side corresponding to lettering 28 from the side corresponding to lettering 30. While raised and/or recessed markings are presently preferred, one skilled in the art will appreciate that other markings such as inked markings or different pigmentations, may be used to identify quadrants of the model 10.

In accordance with the present invention, the model 10 of a human female breast constructed as described above may be used to train a person to detect breast tumors. While the palpation of the model of a human female breast alone may be used to train a person to detect breast cancer as disclosed by U.S. Pat. No. 4,134,218, the present inventor has discovered that by fostering a visual and tactile interrelationship, simulated tumors 20 which are smaller and more difficult to locate may be found with increased efficiency and with greater sensitivity in the tactile sensory modality. The method of fostering such interrelationship may be called a sensory integration technique. According to the present invention, a method of training a person to detect breast tumors comprises providing a person with a model 10 of a human female breast as described above where the person conducts the following steps:

(1) overlying and removably attaching the opaquing means 22 to the transparent backing member 14 of the model 10;

(2) palpating the model 10 in a predetermined pattern to create a tactile sensation in the person as to presence and location of a simulated tumor 20;

(3) removing the opaquing means 22 from the transparent backing member 14;

(4) visually inspecting the model 10 to visually determine the presence and location of a simulated tumor 20; and (5) palpating the model 10 to confirm the presence and location of a simulated tumor 20 by tactile sensation.

It is important that the person being trained is not allowed to visually inspect the model prior to the first palpation step. Attaching the opaquing means 22 to the backing 14 substantially prevents such visual inspection. Without visual inspection, the person being trained must rely solely upon tactile sensation.

Palpation may be conducted using any of the palpation techniques known to those skilled in the medical arts, but preferably the palpation technique known as the MammaCare ® Method, which assures complete palpation of the breasts in both area and depth to locate even extremely small tumors. It is presently preferred that the palpation be conducted in substantially the following manner: using the flat areas of the middle three fingers above the first joints, small circles about the size of a dime should be made at one location of the model 10 using varying amounts of pressure. Next, such palpation should be conducted at a different location upon the model 10 about one finger width away from the location previously palpated. The direction from one location to the next is preferably in a straight line so that the overall palpation pattern forms parallel strips, as opposed to concentric circles. To foster this sense of direction and pattern, it may be desired to form the model 10 so that the base thereof (i.e., the portion of the model formed by the transparent backing member 14) has a square or rectangular shape.

As part of the MammaCare ® Method, an interactive instructional videotape has been developed, explaining the use of the model according to the present invention in relation to the process of actual breast self examination used by the trainee.

The method described above may be repeated using a different model to vary the characteristics and location of the simulated tumors 20 therein, to vary the firmness of the simulated adipose tissue 18, to vary the presence or absence or characteristics of the third means 24 simulating glandular, connective and/or skeletal tissue or combinations thereof, as well as other variables. Similarly, the same model 10 may be used and the simulation characteristics may be altered by changing the relative position of the model.

In one test conducted, a group of eight women were given a breast model as described above generally with respect to FIG. 1. The model contained five simulated tumors having dimensions of about 3, 5, 5, 7 and 10 mm, respectively, in various locations. Prior to training using the sensory integration technique, the group of women collectively found only 6 simulated tumors out of 40 collective chances (eight women times five tumors), a gross success rate of 15%. None of the women found the smallest simulated tumor (measuring about 3 mm.) After training with the sensory integration technique according to the present invention, the group of women were collectively successful 33 out of 40 times, a substantially increased gross success rate of 82.5%. Only one woman was unable to locate the simulated tumor measuring about 3 mm after training.

In other studies women used a simple breast model without electrical apparatus of the type illustrated and described in U.S. Pat. No. 4,134,218 and without the opaquing means 22 of the present invention. Palpation training was conducted similar to that used in training with the model of the present invention, except that the removal of the opaquing means and visual inspection steps were omitted when the model not having opaquing means was used. Prior to training on the model not having opaquing means, simulated tumor detection was similar to the results achieved above prior to training on the model of the present invention. Using the prior art method with the model not having opaquing means, simulated tumor detection increased to about 60% to about 65% on average. Accordingly, it should be clear that breast cancer detection techniques using the present invention, resulting in a gross detection rate of about 82.5% is a substantial improvement over training using the prior art model and method. While the inventors do not wish to be bound by any particular theory, it is believed that the improved results are due to the sensory integration technique of the method and using the model according to the present invention.

The present invention may be embodied in other specific forms without departing from the spirit or essential attributes thereof and, accordingly, reference should be made to the appended claims, rather to the foregoing specification as indicating the scope of the invention.

I claim:

1. A model of a human female breast for teaching breast examination, comprising an opaque, elastomeric membrane simulating skin, a transparent backing member connected to the opaque membrane to define a chamber therebetween, first means simulating adipose tissue disposed in the chamber, at least one second means simulating a tumor within the chamber and opaquing means overlying and being removably attached to the transparent backing member.

2. The model according to claim 1, wherein the transparent backing member is an elastomeric membrane.

3. The model according to claim 1, wherein the opaquing means comprises an opaque, pliable sheet material adhesively attached to the backing member.

4. The model according to claim 3, wherein the sheet material is a textile fabric coated with an adhesive on one side thereof.

5. The model according to claim 1, further comprising third means simulating glandular, connective and/or skeletal tissue being disposed in the chamber and adjacent the backing member, the third means being harder than the first means and having an irregular surface adjacent the first means.

6. The model according to claim 5, wherein the third means is disposed adjacent only a portion of the backing member.

7. The model according to claim 6, wherein a first indicating means is disposed on the opaque membrane overlying a portion of the chamber containing only the first and second means, and a second indicating means is disposed on the opaque membrane overlying a portion of the chamber containing the first, second and third means.

8. The model according to claim 7, wherein the first and second indicating means are raised from the external surface of the opaque membrane.

9. The model according to claim 5, wherein a plurality of second means of different sizes and hardnesses is disposed in the chamber.

10. The model according to claim 9, wherein at least one second means is attached to the irregular surface of the third means.

11. The model according to claim 1, wherein a plurality of second means of different sizes and different hardnesses is disposed in the chamber.

12. The model according to claim 11, wherein at least one second means is attached to the opaque membrane.

13. The model according to claim 11, wherein at least one second means is attached to the backing member.

14. The model according to claim 11, wherein at least one second means is disposed freely within the first means.

15. The model according to claim 11, wherein at least one second means is attached to a layer of elastomeric resin polymer fixed within the chamber.

16. The model according to claim 1, wherein the second means comprises sponged silicone rubber.

17. A method of training a person to detect breast tumors by palpating a model of a human female breast having at least one simulated tumor disposed therein, said model having an opaque, elastomeric membrane simulating skin, and a transparent backing member providing means for visually inspecting the presence and location of a simulated tumor, comprising:
  (1) overlying and removably attaching opaquing means to the transparent backing member of the model;
  (2) palpating the model in a predetermined pattern to create a tactile sensation in the person as to the presence and location of a simulated tumor;
  (3) removing the opaquing means;
  (4) visually inspecting the model to visually determine the presence and location of a simulated tumor; and
  (5) palpating the model to confirm the presence and location of a simulated tumor by tactile sensation.

18. The method according to claim 17, wherein the opaquing means comprises an opaque, pliable sheet material and method step (1) comprises adhesively attaching the opaquing means to the backing member.

19. The method according to claim 18, wherein the sheet material is a textile fabric coated with an adhesive on one side thereof.

* * * * *